(12) United States Patent
Müller

(10) Patent No.: US 6,204,570 B1
(45) Date of Patent: Mar. 20, 2001

(54) METHOD FOR INITIALIZING AN ANTI-THEFT SYSTEM OF A MOTOR VEHICLE

(75) Inventor: Norbert Müller, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/444,963

(22) Filed: Nov. 22, 1999

Related U.S. Application Data

(63) Continuation of application No. PCT/DE98/01008, filed on Apr. 8, 1998.

(30) Foreign Application Priority Data

May 21, 1997 (DE) ............................................. 197 21 286

(51) Int. Cl.⁷ ...................................................... G06F 7/04
(52) U.S. Cl. ........................ 307/10.5; 307/10.2; 180/287; 340/825.3; 340/825.31

(58) Field of Search ................................. 307/10.1, 10.5, 307/10.2, 9.1; 340/825.31, 825.34, 825.3, 825.32, 825.72, 825.69; 180/287

(56) References Cited

FOREIGN PATENT DOCUMENTS

| 4325221A1 | 2/1995 | (DE) . |
| 4333474A1 | 2/1995 | (DE) . |
| 19526530C1 | 8/1996 | (DE) . |
| 0695675A1 | 2/1996 | (EP) . |
| 0704352A1 | 4/1996 | (EP) . |

*Primary Examiner*—Albert W. Paladini
(74) *Attorney, Agent, or Firm*—Herbert L. Lerner; Laurence A. Greenberg; Werner H. Stemer

(57) ABSTRACT

A number (n) of keys is assigned to an anti-theft system. In order to initialize the anti-theft system, at least the number minus one (n−1) keys must be present so that new coding data can be formed using the previous coding data. During the initialization, the number of all the authorized keys is written into each key. If the vehicle is stolen, the insurer of the vehicle can thus compare the number of authorized keys with the keys that are actually submitted.

10 Claims, 2 Drawing Sheets

METHOD FOR INITIALIZING AN ANTI-THEFT SYSTEM OF A MOTOR VEHICLE

CROSS-REFERENCE TO RELATED APPLICATION

This is a continuation of copending International Application PCT/DE98/01008, filed Apr. 8, 1998, which designated the United States.

BACKGROUND OF THE INVENTION

Field of the Invention

The invention relates to a method for initializing an anti-theft system, in particular an immobilizer of a motor vehicle. An anti-theft system, known from German Patent DE 195 26 530 C1, has a plurality of keys which must be used to provide proof of authorization before the motor vehicle can be used. This takes place in a dialog process in which a request signal is transmitted from the motor vehicle to a key, which transmits back its code signal in response. The code signal is checked for its authorization in the motor vehicle.

If a control unit has to be replaced in the vehicle, the new control unit is initialized by using at least two keys that transfer their code signal to the motor vehicle. However, in such an anti-theft system, it is still possible to commit insurance fraud by offering the vehicle to a purchaser together with two or more keys. The insurer of the vehicle is informed that the vehicle has been stolen together with one key.

SUMMARY OF THE INVENTION

It is accordingly an object of the invention to provide a method for initializing an anti-theft system of a motor vehicle which overcomes the above-mentioned disadvantages of the prior art methods of this general type, which provides maximum security against illegitimate initialization.

With the foregoing and other objects in view there is provided, in accordance with the invention, a method for initializing an anti-theft system of a motor vehicle, the anti-theft system having a total number (n) of portable electronic keys which, when required, each independently emitting a code signal as an authentication signal, the code signal being received by an electronic lock in the motor vehicle and compared with a setpoint code signal being one of stored and generated in the lock, the method which includes:

performing an initialization of the portable electronic keys and of the lock, which requires that a new total number of all the portable electronic keys assigned to a lock of an anti-theft system is chosen. Then, new coding data are formed using code signals from all-minus one, of the previous portable electronic keys and using code signals from the lock. The new coding data are stored together with the new total number of the portable electronic keys in all of the portable electronic keys and in the lock. All the previously valid coding data in the portable electronic keys and in the lock are then deactivated.

In the invention, all the keys and the lock are initialized by virtue of the fact that new coding data are formed both from coding data from all the keys that have previously been assigned to the anti-lock system and from coding data from the lock. The new coding data are stored in all the keys and in the lock together with the total number of all the keys that are assigned to the anti-theft system. All the previous coding data are deleted or overwritten.

Since the total number of all the keys assigned to the anti-theft system is stored, both in each key and in the lock, it is possible at any time for a third party to interrogate, if proof of authorization is provided, how many keys have been assigned to the anti-theft system. A user can initialize the anti-theft system only if he has all the keys except one available. If the previous owner provides a purchaser with more than the number of keys specified to the insurer of the vehicle, this can easily be proven.

In the invention, the coding data are available in the form of a mathematical algorithm or in the form of a binary coded signal in the key and in the lock, and/or in a central memory unit. The initialization of a replacement key can take place here only if at least the defined total number of keys minus one key are present during the initialization process.

The date and time, together with the total number of keys, can be stored in the keys and in the lock. As a result, attempts at manipulation become apparent afterwards. The coding data are transmitted telemetrically from each key to the lock or from a central database at the premise of a manufacturer to a diagnostic unit and from there to the lock.

Other features which are considered as characteristic for the invention are set forth in the appended claims.

Although the invention is illustrated and described herein as embodied in a method for initializing an anti-theft system of a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
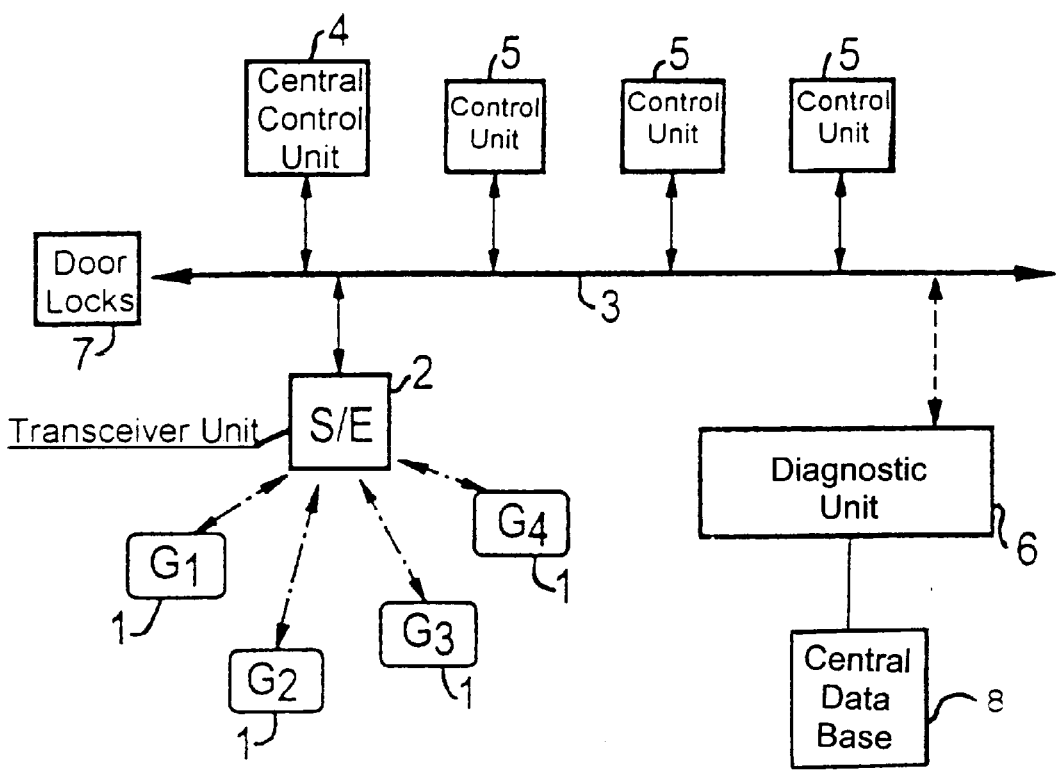
FIG. 1 is a diagrammatic, block diagram of an anti-theft system of a motor vehicle according to the invention.

In all the figures of the drawing, sub-features and integral parts that correspond to one another bear the same reference symbol in each case. Referring now to the figures of the drawing in detail and first, particularly, to FIG. 1 thereof, there is shown an anti-theft system for a motor vehicle that can prevent the motor vehicle from being used in accordance with the regulations by an unauthorized user. In order to prove authorization (authentication), a user requires a key 1. The key 1 contains a transceiver (not shown) which transmits, when requested by the anti-theft system, a code signal to a lock of the anti-theft system in a wireless fashion. The lock has a transceiver unit 2 that is connected to one or more antennas. The transceiver unit 2 demodulates the code signal received by the antenna and feeds it via a data-line 3 to a central control unit 4. There, the code signal is checked for its authorization by comparing it with an expected setpoint code value.

In order to increase security further, further control units 5 can also be included in the motor vehicle in the authentication method. For this purpose, the central control unit 4 transmits a request signal via the data-line 3 to the control units 5 that respond with their own code signal. The code signal of the key 1 is checked only if the control units 5 respond correctly. The control units 5 will respond correctly only if the control units 5 are enabled. Hence, It is impossible to activate the motor vehicle unless the control units 5 are enable. After the authorization is recognized, all the doors are unlocked or an immobilizer is disabled.

Such an anti-theft system is initialized at the end of the line at the manufacturer of the vehicle. For this purpose, the coding data are stored in the central control unit 4, and if appropriate in the control units 5 in the motor vehicle and in all the keys 1 which are assigned to the anti-theft system. The coding data are specifically only for the anti-theft system of the motor vehicle, and contain a secret code (cryptokey) which cannot be read out, and vehicle-specific data together with the total number of keys 1 which are assigned to the anti-theft system of the motor vehicle.

In order to prove authorization for use, a random number is generated in the central control unit 4 of the motor vehicle. The random number is transmitted, when access is requested by user via the key 1, via the data line 3 and the transceiver 2 to the key 1 that the user who wishes to gain access carries on him. The random number is also stored in the central control unit 4.

In the key 1, the random number and the cryptokey are used to generate a code signal that is transmitted back to the central control unit 4 via the antenna. Since the same cryptokey is stored in the central control unit 4, it is possible to use the random number to generate a setpoint code signal that is compared with the received code signal in the central control unit 4. If the two code signals correspond, authorization is proven.

The setpoint code signal can also be stored in the lock. The received code signal is then compared with the stored setpoint code signal.

When the vehicle is purchased, the owner of the motor vehicle receives all the keys 1 that are assigned to the vehicle together with the vehicle log book. The owner requires a single key 1 to use the motor vehicle. He can store the rest of the keys 1 safely at home.

If the motor vehicle is stolen, it is usually not misappropriated with a key 1. On the other hand, in the case of carjacking/carnapping, the vehicle is usually misappropriated together with the key 1 that is currently being used. However it is very improbable that the vehicle will be stolen with more than one key 1. What usually happens is that the key 1 is lost and then a replacement key is desired for it.

If a new key 1 (replacement key for a lost key 1 or an additionally desired key 1) is added to the anti-theft system, this key 1 together with the remaining keys 1 and the lock, i.e. the entire anti-theft system, are newly initialized.

Figure 2:
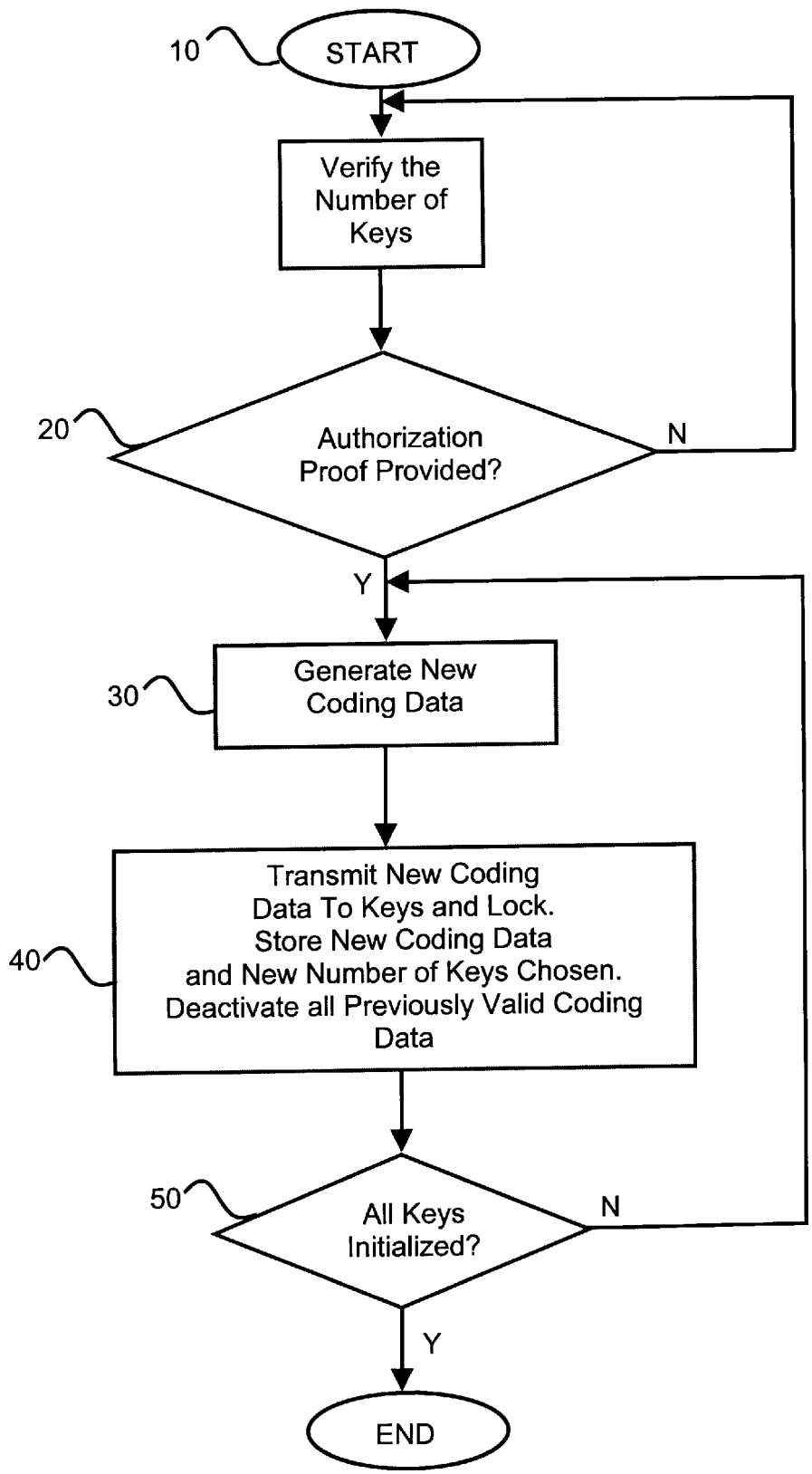
FIG. 2 is a flowchart of a method for initializing the anti-theft system.

The method for initialization is explained in more detail with reference to FIG. 2. It is assumed here that the anti-theft system has already been initialized once at the end of the line at the premises of the manufacturer of the vehicle.

The initialization is primarily performed by the control unit 4. The control unit 4 verifies the number of keys used in the initialization process (step 10) and then gives the appropriate response how to proceed (step 20). Also the control unit generates the coding data (step 30) which are then transmitted via the data line 3 to the keys and locks (step 40).

First, the total number n of all keys 1 that have been previously assigned to the anti-theft system must be known and is performed in step 10. For example, this can be achieved by accessing this information from the central control unit 4. Then, the new total number x of all the keys 1 that are to be assigned to the anti-theft system is defined. If a key 1 is lost, there are still n-1 keys 1 available. If just one new key 1 is added, the new overall number x is equal to the previous overall number n. If an additional key 1 is required above and beyond this, the new overall number x=n+1.

In order to initiate the initialization process, it is necessary for the authorization to be proven in step 20 (for example by emitting a code signal of the authorized key 1). If this proof is provided, the new coding data will be generated in the central control unit 4 in step 30. However, this requires all the available keys 1 that have been authorized hitherto, and the lock. A maximum of only one of the previous total number n of keys 1 may be absent from the initialization process, i.e. at least n-1 previously authorized keys 1 must be present.

In the example according to FIG. 1, the anti-theft system is assigned four keys 1, specifically the keys G1 to G4. The previous total number n of keys 1 is therefore n=4. If one of the keys 1, for example the key G4 is lost, all three remaining keys G1 to G3 (=n-1) are required for the new initialization. It is possible for one or more replacement keys to be initialized together with these keys 1, so that the new total number is x=4 (or x>4).

New coding data are generated from the coding data of the three remaining keys G1 to G3 and from the coding data in the central control unit 4 which are transmitted via the data line 3 and are stored both in all the keys 1 (i.e. also in the replacement keys) and in the lock in step 40. In step 50, it is then checked if all the keys and the lock have been initialized with the new code date. If it is not the case, as requested, that all the keys 1 are present, all the access-authorized keys 1 are deleted by deleting all of the coding data. In this way it is impossible to prove authorization with any key 1. The necessary coding data must then be requested from a database that is located at the premise of the manufacturer of the vehicle and controlled by the manufacturer. However, this initially requires proof, for example submission of the vehicle log book (i.e. vehicle title).

If it is the case, as initially defined, that all the keys 1 are supplied with the coding data, the new total number x of all the keys 1 which are assigned to the anti-theft system is also stored both in the keys and in the lock. The initialization is terminated. The new total number x of keys 1 can be read out at any time, but only changed (overwritten) during an initialization. Thus, it is possible to prove how many keys 1 were assigned to the anti-theft system. The coding data cannot be read out from the outside, neither can they be deleted from the outside.

In the case of a replacement key, it is also possible to provide a limitation of use during the initialization. This replacement key may be permitted, for example, a limited number of starting operations, a limited number of kilometers traveled, for just a predefined period of time or a specific geographic area. This is particularly valuable for car rental businesses.

If an owner sells his vehicle together with the key 1, but reports the vehicle stolen (insurance fraud), the "receiver of stolen goods" who is purchasing the vehicle can indeed use the vehicle, but only with restrictions. He cannot initialize new keys 1 because he lacks the remaining keys 1 that are assigned to the anti-theft system. Resale is no longer lucrative because only one key 1 is available. It is not possible for him to make replacement keys either.

If the previous owner provides more than one key 1, he can no longer initialize the anti-theft system himself either. By using the total number n, x, the correctness of the owner information concerning the number of keys 1 which are available can be checked. If more than one key 1 is missing, there is the suspicion that insurance fraud has been committed.

If the owner sells the vehicle with a plurality of keys 1 in an unauthorized way (and maintains that his vehicle has been stolen), this can be proven to the insurer of the vehicle by virtue of the fact that the total number of keys 1 which are assigned to the vehicle can be checked. Since the total number, together with the coding data, is always stored whenever an initialization takes place, it is possible for the insurer of the vehicle or for other third persons (i.e. police) to prove how many keys 1 were assigned to the anti-theft system.

In order to ascertain when the anti-theft system, i.e. the keys 1 and the central control unit 4, were initialized or whether a new initialization has taken place after delivery of the series-produced vehicle, it is possible, for example, to store the date and the time of the initialization in a memory in the key 1 and in the lock with the total number x.

In addition, the chassis number can also be stored together with the coding data. In this way, the key 1 can be assigned unambiguously to a motor vehicle. This prevents keys 1 of another motor vehicle being submitted to the insurer of the vehicle as proof of the existing keys 1. During the initialization at the end of the line, the chassis number is written into the key 1 and into the lock (central control unit 4). During later initializations, the chassis number is removed from the lock or the keys 1 that are still present and written into the replacement keys.

The chassis number can also be communicated to the anti-theft system when proof of an authorization is provided by the central database 8 of the manufacturer by use of a diagnostic unit 6 which can be connected to the motor vehicle.

User-specific data can also be stored in each of the keys 1. If the user wishes to access the motor vehicle with his key 1, the user data are read out. Subsequent to this it is possible, for example, for seats and mirrors to be set automatically to the corresponding user.

For the anti-theft system to be initialized, it must be placed in an initialization state. For this purpose, it is possible, for example, to connect the external diagnostic unit 6 that places the anti-theft system in the initialization state by emitting a special signal. If the key 1 then emits its authorized code signal, the initialization can take place.

The coding data that is necessary for the initialization can then be read out of the existing keys 1 and out of the central control unit 4. In addition, the coding data can be transferred telemetrically via the central database 8. The diagnostic unit 6 can communicate the new coding data to the central control unit 4 via the data-line 3 (bus). The central control unit 4 can then transmit the coding data to the individual keys 1 via the transceiver unit 2.

The new total number of keys 1 may be input using a keypad on the diagnostic unit 6, for example, or communicated to the central control unit 4.

If the central database 8 is located, for example, at the premise of the manufacturer of the vehicle, it is then possible for every initialization process to be monitored by the manufacturer of the motor vehicle.

The central control unit 4 is composed essentially of a microprocessor with associated memories (RAM/ROM).

The coding data can be stored in suitable EEPROMs of the central control unit 4 and of the keys 1. It is, however, not possible to read out the EEPROMs from the outside. The coding data cannot be overwritten unless proof of authorization is provided. Only the total number n, x and, if appropriate, the date and time can be output.

The central control unit 4 can be disposed concealed in the motor vehicle in a manipulation-proof way as a separate unit. However, it can also be integrated in one of the control units 5, for example in the engine control unit.

The code signal is transmitted from the key 1 to the lock in a wireless fashion (optically, acoustically, by radio). The total number x can also be transmitted to an interrogation unit in a wireless fashion. In the same way, the total number n, x can be read out by direct contact (electrical transmission of data) by read contacts on the keys 1 with a reading device. The diagnostic unit 6 is advantageously used as a read device for reading out the total number n, x.

The term "key 1" is to be understood as an electronic unit which is disposed on a conventional mechanical door key or ignition key. Data are stored in the electronic unit 1. The key 1 can both receive data (in a wireless fashion) and transmit data (in a wireless fashion or electrically). The electronic unit can, as the key 1, also be in the form of a credit card or of some other suitable, small configuration.

The term "lock" is to be understood as the transceiver unit 2 together with the central control unit 4. The central control unit 4 is connected to door locks 7 or the immobilizer which can be integrated in the engine control unit. The door locks 7 are actuated or the immobilizer is immobilized only if proof of authorization (valid code signal) is provided. The transceiver unit 2 is disposed with its antenna (or a plurality of antennas) on the door locks 7, in external mirrors, on door linings, in the interior of the vehicle or on the ignition lock, for example.

The term "initialization" is to be understood as an initial storage, or repeated storage when required, of data in the keys 1 and in the lock. The user can obtain access to the vehicle, and also use it, only with these data which are specific for each motor vehicle, and if appropriate for each user. The first initialization takes place at the end of the line during the manufacture of the motor vehicle. Since no key 1 has previously been assigned to the anti-theft system, no key 1 is required for the first initialization.

The term "immobilizer" is to be understood as all electronic interventions in electronic units of the motor vehicle which enable the motor vehicle to be started and driven away only when there is an authorized code signal. Thus, the control units 5, like the engine control unit, the ignition control unit, the transmission control unit etc., are integrated individually or together into the immobilizer. The control units 5 are enabled only when there is an authorized code signal. It is impossible to activate the motor vehicle unless the control units 5 are enabled.

The term "code signal" is to be understood as a binary coded signal that is transmitted in a modulated form. The greater the bit length of the signal, the greater the security against unauthorized imitation of the code signal. Security is greatest if the code signal is generated using a secret cryptokey with a cryptographic method.

The method according to the invention for initializing an anti-theft system of a motor vehicle is used to initialize all the keys 1 that are assigned to the vehicle. If the vehicle has been stolen, the insurer of the vehicle can let the total number n, x of existing vehicle keys 1 be known. The total number n, x can be compared with the information provided by the owner of the vehicle. If these types of information do not correspond, insurance fraud is suspected, and legal proceedings are then taken.

If the vehicle has actually been stolen, the owner of the vehicle can submit all the existing keys 1. The insurer of the vehicle or the manufacturer of the vehicle can check this using the total number n, x stored in the key 1 and the stored chassis number and if there are discrepancies there can be further investigation into possible insurance fraud.

I claim:

1. A method for initializing an anti-theft system of a motor vehicle, the anti-theft system having a total number of portable electronic keys which, when required, each independently emit a code signal as an authentication signal, the code signal being received by an electronic lock in the motor vehicle and compared with a setpoint code signal being one of stored and generated in the lock, the method which comprises:

performing an initialization of the portable electronic keys and of the lock, which includes:
choosing a new total number of all the portable electronic keys assigned to a lock of an anti-theft system;
forming new coding data, the new coding data being formed using code signals from all but one, of the previous portable electronic keys and using code signals from the lock;

storing the new coding data together with the new total number of the portable electronic keys, in all of the portable electronic keys and in the lock; and deactivating all the previously valid coding data in the portable electronic keys and in the lock.

2. The method according to claim 1, which comprises storing the new coding data as one of a mathematical algorithm and a binary coded signal in the portable electronic keys, the lock, and a central database.

3. The method according to claim 1, which comprises deleting the previously valid coding data and the new coding data in the lock if the new total number (x) of the portable electronic keys has not been initialized.

4. The method according to claim 1, which comprises reading out the new total number (x) of the portable electronic keys out of a memory if proof of authorization is provided.

5. The method according to claim 1, which comprises storing at least one of a date and a time, together with the new total number (x) of the portable electronic keys in all of the portable electronic keys and in the lock.

6. The method according to claim 1, which comprises transmitting the previously valid coding data of each of the portable electronic keys to the lock.

7. The method according to claim 1, which comprises transmitting coding data of a diagnostic unit which can be connected to the motor vehicle to the lock.

8. The method according to claim 1, which comprises:
transmitting the previously valid coding data of each of the portable electronic keys to the lock; and
transmitting coding data of a diagnostic unit which can be connected to the motor vehicle to the lock.

9. The method according to claim 1, which comprises transmitting coding data telemetrically from a central database to the lock.

10. The method according to claim 1, which comprises transmitting coding data telemetrically from a central database to a diagnostic unit.

* * * * *